(No Model.)
G. H. TANSLEY.
VALVE FOR PNEUMATIC TIRES.
No. 537,654. Patented Apr. 16, 1895.
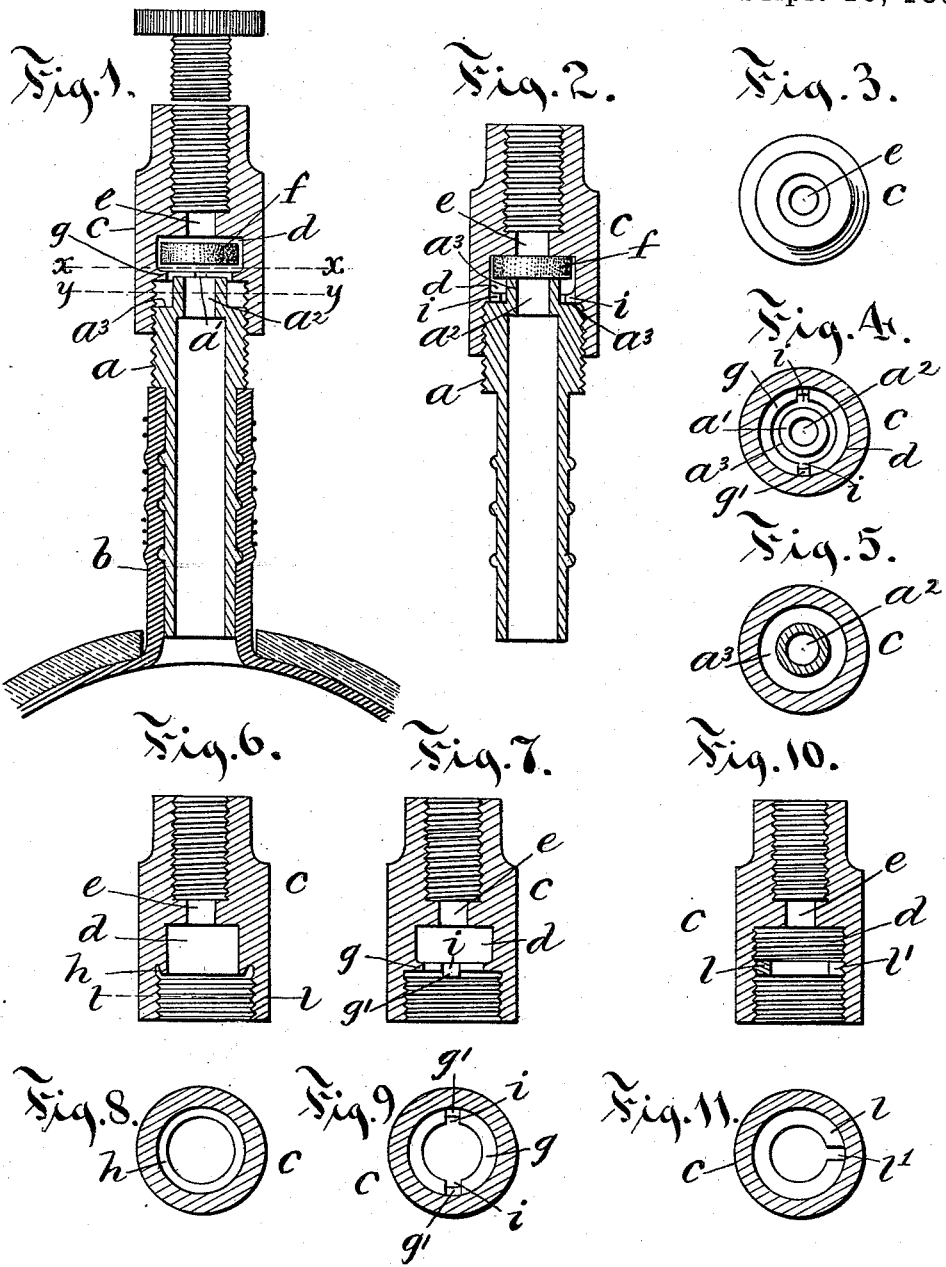
Witnesses:
J. A. Cantin
Arthur B. Jenkins
Inventor:
George H. Tansley
by Chas. L. Burdett
Attorney

UNITED STATES PATENT OFFICE.

GEORGE H. TANSLEY, OF HARTFORD, CONNECTICUT, ASSIGNOR TO BRUNNER & CO., OF SAME PLACE.

VALVE FOR PNEUMATIC TIRES.

SPECIFICATION forming part of Letters Patent No. 537,654, dated April 16, 1895.

Application filed February 4, 1895. Serial No. 537,237. (No model.)

*To all whom it may concern:*

Be it known that I, GEORGE H. TANSLEY, a citizen of the United States, and a resident of Hartford, in the county of Hartford and State of Connecticut, have invented certain new and useful Improvements in Valves for Pneumatic Tires, of which the following is a full, clear, and exact description, whereby any one skilled in the art can make and use the same.

The object of my invention is to provide a valve which is simple and cheap in construction and is provided with easily operated means for permitting the tire to which it is attached to be either inflated or deflated and to also provide for the easy removing and renewing of the elastic valve.

To this end my invention consists in the details of the several parts making up the valve and in the combination of such parts as more particularly hereinafter described and pointed out in the claims.

Referring to the drawings, Figure 1 is a detail view in central longitudinal section through a valve embodying my invention and with the cap removed. Fig. 2 is a detail view in longitudinal section through the valve on a plane at right angles to the plane of view in Fig. 1. Fig. 3 is a detail top view of the valve with the cap removed. Fig. 4 is a detail view in cross section through the body on the valve showing the valve retaining shoulder, and on line $x$—$x$ in Fig. 1. Fig. 5 is a detail view in cross section of the valve or plane denoted by line $y$—$y$ in Fig. 1. Fig. 6 is a detail view in lengthwise section of part of the valve showing it in one stage in the process of manufacture. Fig. 7 is a detail view in lengthwise section through the valve body showing it in a further stage of the process of manufacture. Fig. 8 is a detail view in cross section of the valve body on plane denoted by line $l$—$l$ in Fig. 6 and looking into the valve socket. Fig. 9 is a detail view in cross section of the device as shown in Fig. 7 and looking toward the valve socket. Fig. 10 is a detail view in central longitudinal section of one form of body part showing a split ring used to form the valve retaining flange. Fig. 11 is a detail view in cross section of the body part showing the split ring in plan view.

In the accompanying drawings the letter $a$ denotes that part of the valve body which is adapted to be secured to the tubular stem of a cot $b$ or to a like tube which is secured to a tire or other structure which is constructed to be inflated. This body part $a$ of the valve is tubular and has at the outer end an annular valve seat $a'$, a screw thread on the outer part of the valve body serving as a means for securing to it the part $c$ of the valve body which is made in the two sections as described.

The body part $c$ is tubular and contains a valve socket $d$ which is a chamber larger in diameter than the tubular opening $e$ through the valve body and within which a valve $f$ is held. This valve is preferably of elastic material, as india rubber, and may be of disk shape, as shown, globular or of any other desired shape which enables it to close the tubular opening $e$ through the body part $c$ and also the opening $a^2$ through the body part $a$.

In order to prevent the accidental removal of the valve from the socket it is held therein by a flange $g$. This flange is preferably made integral with the body part $c$ of the valve body in the following manner: A piece of metal of suitable length and shape is bored out from the opposite ends to form a tubular opening through the body part, such opening being of different diameters at different parts of the length. The valve socket $d$ is formed by counter-boring from the lower end of the body part leaving a shoulder at the upper end of the socket and this opening is again counter-bored by a tool of larger diameter, the point of the tool being shaped so as to undercut the shoulder, as at $h$. A punch having grooves in the opposite side is then driven into the opening and used to upset the undercut shoulder and form the flange $g$ which is turned over so as to project inwardly except where the grooves in the side of the punch leave the stock as at $g'$. By this means a port or inlet $i$ for the passage of air is formed through the body part of the flange. A packing of india rubber or other elastic material is then forced into the chamber $d$ through the opening and as this valve is larger in diameter than the distance across between the inner edges of the flange the latter forms a shoulder which holds the valve in place within the socket, the shoulder at the upper part of the socket forming a seat for the valve. It is preferred that the opening $e$ shall be of the same diameter as the opening $a^2$ so that the annular valve seat $a'$ shall compress the valve against a solid seat on the opposite side and effectively prevent the passage of air through the valve when the parts are closed.

On the outer end of the body part $a$ a shoulder $a^3$ is preferably formed and arranged to make contact with the surface of the flange $g$ to prevent too great compression of the valve between the seat $a'$ and the bottom of the socket.

Instead of making the flange $g$ integral with the body part $c$ as described it may be made as illustrated in Figs. 10 and 11 of the drawings, the socket in the valve body being threaded to a sufficient distance and a split ring $l$ screwed into the body part leaving between its upper surface and the bottom of the socket a sufficient space to form a socket for the valve. The opening $l'$ through the body of the split ring affords a port for the passage of air having the same function as the ports $i$ in the other form of construction. The main advantage of this particular construction of the valve is the simplicity of parts and ease of manufacture, nearly all the operations being easily performed on a screw machine without compelling the removal of the part therefrom.

I claim as my invention—

1. In combination with a tubular body part $a$, a tubular body part $c$ removably secured to the body part $a$, a valve chamber larger in diameter than the inlets thereto, a flange on one side of the chamber to hold the valve against removal, a valve loosely supported within the valve chamber and larger in diameter than the openings thereto, and a port or inlet in the flange, all substantially as described.

2. In combination with a tubular body part $a$, a tubular body part $c$ removably secured to the body part $a$, a valve chamber larger in diameter than the inlets thereto and located in the body part $c$, an integral flange on one side of the chamber to hold the valve against removal, a port or inlet through the flange, and a valve loosely supported within the valve chamber and larger in diameter than the openings thereto, all substantially as described.

3. In combination with a tubular body part $c$, a valve chamber larger in diameter than the inlets thereto, a valve loosely supported within the chamber and larger in diameter than the openings thereto, a flange forming one wall of the valve chamber, a port or inlet in the flange, and a tubular body part $a$ removably secured to the body part $c$ and having a valve seat on its inner end to engage the valve, all substantially as described.

4. In combination with a tubular body part $c$, a valve chamber located therein, and larger in diameter than the openings to the chamber, a valve loosely supported within the chamber and larger in diameter than the openings thereto, a flange forming one wall of the valve chamber, and having an inlet therethrough, a body part $a$ adapted to be secured to the body part $c$ by means of interengaging screw threaded parts, a valve seat on the end of the body part $a$, and a shoulder on the body part $a$ to engage the flange whereby the degree of compression of the valve is controlled, all substantially as described.

GEORGE H. TANSLEY.

Witnesses:
ARTHUR B. JENKINS,
JOSEPH ARTHUR CANTIN.